United States Patent Office 3,238,245
Patented Mar. 1, 1966

3,238,245
PREPARATION OF PENTAERYTHRITOL
TRINITRATE ACRYLATE
William H. Reedy, Jr., Woodbury Heights, N.J., assignor to E. I. du Pont de Nemours and Company, Wilmington, Del., a corporation of Delaware
No Drawing. Filed Sept. 8, 1959, Ser. No. 838,796
8 Claims. (Cl. 260—467)

The present invention relates to a process for preparing esters of pentaerythritol trinitrate. More particularly, the present invention relates to a process for preparing pentaerythritol trinitrate acrylate.

In recent years, pentaerythritol trinitrate acrylate has achieved considerable interest as an ingredient for rocket propellants. This interest stems from the fact that this ester is a polymerizable high-energy compound, and as such can be used alone or in combination with other polymerizable compounds as a high-energy binder for composite solid propellants for rockets. Owing to the high degree of interest presented by pentaerythritol trinitrate acrylate and to its potential utility in a vitally important field of endeavor, a process for the preparation of this ester is highly desirable, especially such a process which is relatively economical and suitable for use on a large scale.

Accordingly, it is an object of the present invention to provide a process for the preparation of pentaerythritol trinitrate acrylate. It is a further object of the present invention to provide a process for the preparation of pentaerythritol trinitrate acrylate in good yield from pentaerythritol trinitrate and acrylic acid. Other objects will become apparent as the invention is further described.

It has been found that the foregoing objects may be achieved when pentaerythritol trinitrate is reacted with acrylic acid in the presence of phosgene or phosphorus oxychloride and a tertiary amine.

In accordance with the process of the present invention, pentaerythritol trinitrate acrylate is obtained when acrylic acid is esterified with pentaerythritol trinitrate in the presence of phosgene or phosphorus oxychloride and a tertiary amine, e.g., triethylamine, at temperatures up to about 75° C.

The following examples serve to illustrate specific embodiments of the method of carrying out the process of the present invention. However, they will be understood to be illustrative only and not to limit the invention in any manner. The parts in the examples are parts by weight.

*Example 1*

Acrylic acid (9 parts) was added to a solution of 27.1 parts of pentaerythritol trinitrate in 134 parts of methylene chloride, and the resulting mixture was cooled to 10° C. While the mixture was being stirred, 37.6 parts of triethylamine was added dropwise at a rate such that the temperature did not rise above 20° C. After the addition of the amine, a solution of 13.3 parts of phosgene in 11.1 parts of methylene chloride was added to the stirred mixture over a period of 15 minutes, after which the mixture was stirred for an additional 4 minutes. The temperature during the addition of the phosgene solution and the subsequent stirring was 20° C. The mixture was air-sparged to remove residual phosgene and was made acidic with 4% sulfuric acid. The methylene chloride layer was washed with 155 parts of a 5% aqueous sodium bicarbonate solution and concentrated to dryness. Recrystallization of the residue from 75 parts of methanol gave 30.6 parts of pentaerythritol trinitrate acrylate (94% yield).

Similar results are obtained when 14.1 parts of β-chloropropionic acid is substituted for the 9 parts of acrylic acid in the above example.

*Example 2*

Acrylic acid (9.35 parts) and triethylamine (35.3 parts) were added to a solution of 27.1 parts of pentaerythritol trinitrate in 134 parts of methylene chloride as described in Example 1. Phosphorus oxychloride (18.4 parts) was added to the mixture over a period of 20 minutes, the temperature being maintained at 20° C. during the addition. After work-up of the methylene chloride layer as described in Example 1, pentaerythritol trinitrate acrylate was obtained in the amount of 27.2 parts (83.7% yield).

*Example 3*

Acrylic acid (9 parts) was added to a solution of 27.1 parts of pentaerythritol trinitrate in 267 parts of methylene chloride, and the resulting mixture was cooled to 10° C. Triethylamine (35.3 parts) was added dropwise to the stirred mixture at a rate such that the temperature did not rise above 20° C. After the addition of the amine, a solution of 7.94 parts of phosgene in 11.1 parts of methylene chloride was added to the stirred mixture over a period of 10 minutes, after which the mixture was stirred for an additional 5 minutes. The temperature during the addition of the phosgene solution and the subsequent stirring was 20° C. The product was recovered as described in Example 1 to give 17.7 parts of pentaerythritol trinitrate acrylate (57.4% yield).

*Example 4*

The procedure of Example 3 was repeated except that 15.8 parts of phosgene dissolved in 11.1 parts of methylene chloride was added during a period of 15 minutes, after which the mixture was stirred for 15 minutes. The yield of pentaerythritol trinitrate acrylate was 88.1%.

*Example 5*

A solution of 27.1 parts of pentaerythritol trinitrate and 9 parts of acrylic acid in 267 parts of methylene chloride was cooled to 10° C. and then, with stirring, 35.3 parts of triethylamine was added dropwise to the solution at a rate such that the temperature did not rise above 20° C. Then with vigorous agitation, a solution of 11.8 parts of phosgene in 11.1 parts of methylene chloride was added to the mixture over a period of 10 minutes, after which the mixture was stirred for an additional 5 minutes. The temperature during the addition of the phosgene solution and the subsequent stirring was 0° C. The product was recovered as described in Example 1 to give pentaerythritol trinitrate acrylate in 90.8% yield.

*Example 6*

Acrylic acid (9.35 parts) was added to a solution of 27.1 parts of pentaerythritol trinitrate in 149 parts of chloroform, and the resulting mixture was cooled to 10° C. Triethylamine (35.3 parts) was added dropwise to the stirred mixture at a rate such that the temperature did not rise above 20° C. After the addition of the amine, the mixture was heated to reflux temperature and a solution of 9.2 parts of phosphorus oxychloride in 74.5 parts of chloroform was added dropwise over a period of 30 minutes, the temperature being maintained at 65–70° C. during the addition. The mixture was stirred for an additional 20 minutes at 60–65° C. The chloroform layer was washed with aqueous sodium bicarbonate and concentrated to dryness. Recrystallization of the residue from methanol gave 13.0 parts of pentaerythritol trinitrate acrylate (40% yield).

Example 7

A solution of 27.1 parts of pentaerythritol trinitrate and 9 parts of acrylic acid in 267 parts of methylene chloride was cooled to 10° C. and then, with stirring, 64.8 parts of tri-n-butylamine was added dropwise to the solution at a rate such that the temperature did not rise above 20° C. Then, with vigorous stirring, a solution of 11.8 parts of phosgene in 11.1 parts of methylene chloride was added to the mixture over a period of 12 minutes, after which the mixture was stirred for an additional 5 minutes. The temperature during the addition of the phosgene solution and the subsequent stirring was 20° C. By work-up of the methylene chloride layer as described in Example 1, pentaerythritol trinitrate acrylate was obtained in 64.8% yield.

Chromatographic analyses of the products obtained in the experiments described in the foregoing examples indicated that the products contained essentially no unconverted pentaerythritol trinitrate. The high degree of utilization of the alcohol, the high yields of ester obtained, and the short reaction time required make the present process attractive from an economic standpoint. Another advantageous feature of the present process is that the esterification is effected at moderate temperatures. As a result, no complicated heating equipment is required. Furthermore, the use of moderate temperatures reduces the possibility of the formation of undesirable by-products which are capable of being formed from competing reactions at higher temperatures. The use of phosgene or phosphorus oxychloride in the reaction also is a desirable feature of the process inasmuch as no organic residue is formed from either of these reactants, thereby resulting in simple waste stream disposal.

The process of the present invention comprises mixing together pentaerythritol trinitrate, acrylic acid, a tertiary amine, e.g., triethylamine, and phosgene or phosphorus oxychloride at temperatures up to about 75° C., and thereafter separating the acrylic ester. The use of a liquid diluent, while not essential to the carrying out of the present process, is desirable. Inasmuch as salt formation occurs during the reaction, the use of a diluent facilitates agitation of the reaction mixture and aids in heat removal. Therefore, a diluent generally will be used, although the particular material used for this purpose is not critical. Preferably, the diluent used will be a solvent for the alcohol. We have found that for reasons of economy and availability the chlorinated hydrocarbons, e.g., methylene chloride and chloroform, are suitable diluents for the reaction mixture. Usually, the ratio of the diluent to the alcohol, by weight, will be between about 3 to 1 and 15 to 1.

The amounts of the reactants used in the present process may vary within wide limits. To a certain extent, the amounts of reactants used will depend on such factors as the reaction temperature, purity of the starting materials, etc. For example, while the amount of acrylic acid used generally will be one mole per mole of pentaerythritol trinitrate, if the alcohol is known to contain impurities which may react with the acid, an amount of acid in excess of one mole per mole of alcohol generally will be used to assure complete utilization of the alcohol. Usually from 0.75 to 1.5 moles of acrylic acid per mole of pentaerythritol trinitrate will be used.

In a further embodiment of the present invention, acrylic acid need not be added as such to the reaction mixture but may be formed in situ, for example by the addition of a β-halo propionic acid to the reaction mixture, which acid is dehydrohalogenated to acrylic acid under the conditions of the reaction.

The amount of phosgene or phosphorus oxychloride used should be at least about 0.5 mole per mole of pentaerythritol trinitrate. The use of phosgene or phosphorus oxychloride in amounts greatly in excess of this minimum, however, is in no way deleterious to the present process. As is shown in Example 4, high yields of pentaerythritol trinitrate acrylate are obtained when the phosgene/alcohol mole ratio is more than three times higher than 0.5/1. Because of economic considerations, I prefer to use not more than 2 moles of the acid chloride per mole of alcohol. While I do not wish to be limited to any particular theory, I believe that the acid chloride, i.e., phosgene or phosphorus oxychloride, reacts with the amine salt of acrylic acid (formed by the reaction of the acid with the tertiary amine) to form acrylic anhydride, which in turn reacts with the alcohol to form the acrylate.

While other tertiary amines may be used in the present process, for reasons of economy, ready availability, and ease of handling, we have found triethylamine and tri-n-butylamine to be particularly advantageous for use in the present process. Preferably the amine is used in a ratio of at least 2 moles per mole of pentaerythritol trinitrate. The use of more than 4 moles of amine per mole of alcohol is not economically desirable.

The present process is carried out at temperatures within the range of about 0° C. to 75° C. The use of temperatures below 0° C. also is within the scope of the present process, but because of the costly cooling equipment which would be necessary for operation at such low temperatures, the use of temperatures within the range specified above is preferred. Above 75° C., while a certain amount of acrylate is formed, undesirable side-reactions occur which lead to an impure product. The particular temperature used will depend on such factors as the boiling point of the diluent used, the desired reaction time, etc.

While the esterification proceeds rapidly and smoothly at atmospheric pressure, the use of higher pressures is not deleterious to the process and may be used if desired. Pressures up to 100 pounds per square inch are feasible.

The time required for the completion of the esterification is not a critical feature of the present invention. As may be seen by reference to the examples, the total reaction time is dependent on such factors as the desired reaction temperature (which in turn depends on the boiling point of the diluent which may be used), the amounts of reactants used, the amount of external cooling provided, etc. As is shown in the examples, the time required for esterification amounts to only a few minutes, the reaction period being determined chiefly by the rate at which the reactants are added in order that the desired reaction temperature be maintained.

The order in which the reactants are charged to the reactor is not critical to the process although it is preferable that the pentaerythritol trinitrate not be added last.

Although the process of the present invention has been illustrated as a batch-wise process, the effecting of the process in a continuous manner is fully feasible. For example, the acrylic acid, pentaerythritol trinitrate, tertiary amine, and phosgene or phosphorus oxychloride may be introduced continuously into a reactor, while the product is continuously removed.

The invention has been described in detail in the foregoing. It will be apparent to those skilled in the art that many variations are possible without departure from the scope of the invention. I intend, therefore, to be limited only by the following claims.

I claim:

1. A process for the preparation of pentaerythritol trinitrate acrylate which comprises reacting pentaerythritol trinitrate and acrylic acid in the presence of an acid chloride selected from the group consisting of phosgene and phosphorus oxychloride and a tertiary amine selected from the group consisting of triethylamine and tributylamine.

2. A process according to claim 1, wherein the reaction is carried out at a temperature within the range of 0° and 75° C.

3. A process according to claim 1, wherein the acid chloride is phosgene.

4. A process according to claim 1, wherein the tertiary amine is triethylamine.

5. A process according to claim 1, wherein the acid chloride is present in an amount of at least 0.5 mole per mole of pentaerythritol trinitrate.

6. A process according to claim 1, wherein the tertiary amine is present in an amount in excess of 2 moles per mole of pentaerythritol trinitrate.

7. A process for the preparation of pentaerythritol trinitrate acrylate which comprises reacting pentaerythritol trinitrate and acrylic acid in the presence of an acid chloride selected from the group consisting of phosgene and phosphorus oxychloride, a tertiary amine selected from the group consisting of triethylamine and tributylamine, and an inert diluent.

8. A process according to claim 7, wherein the diluent is methylene chloride.

No references cited.

CARL D. QUARFORTH, *Primary Examiner.*

LEON D. ROSDOL, *Examiner.*